(12) United States Patent
Borthwick et al.

(10) Patent No.: US 7,794,202 B2
(45) Date of Patent: Sep. 14, 2010

(54) TURBINE BLADE

(75) Inventors: Donald Borthwick, Tyne & Wear (GB);
Shun Chen, San Ramon, CA (US);
Heinrich Stüer, Haltern (DE); Frank Truckenmüller, Orlando, FL (US)

(73) Assignee: Siemens Aktiengesellschaft (DE)

( * ) Notice: Subject to any disclaimer, the term of this patent is extended or adjusted under 35 U.S.C. 154(b) by 145 days.

(21) Appl. No.: 10/562,740

(22) PCT Filed: Jun. 18, 2004

(86) PCT No.: PCT/EP2004/006624
§ 371 (c)(1),
(2), (4) Date: Jun. 5, 2006

(87) PCT Pub. No.: WO2005/005784
PCT Pub. Date: Jan. 20, 2005

(65) Prior Publication Data
US 2007/0071606 A1 Mar. 29, 2007

(30) Foreign Application Priority Data
Jul. 9, 2003 (EP) .................................. 03015496

(51) Int. Cl.
*F01D 9/04* (2006.01)
*F01D 5/14* (2006.01)
(52) U.S. Cl. ..................... 415/192; 415/191; 415/208.2; 415/210.1; 415/211.2; 416/238; 416/242; 416/243; 416/DIG. 2
(58) Field of Classification Search ................. 415/181, 415/191, 192, 208.1, 208.2, 209.4, 210.1, 415/211.2; 416/223 A, 238, 242, 243, DIG. 2
See application file for complete search history.

(56) References Cited

U.S. PATENT DOCUMENTS

| 2,738,950 A | | 3/1956 | Price |
| 3,745,629 A | | 7/1973 | Pask et al. |
| 4,500,256 A | * | 2/1985 | Bessay et al. ............... 415/191 |

(Continued)

FOREIGN PATENT DOCUMENTS

DE 37 43 738 A1 7/1988

(Continued)

*Primary Examiner*—Christopher Verdier (57) ABSTRACT

A turbine blade is provided, comprising a stator-side end located toward a stationary stator cylinder of the turbine, a rotor-side end located toward an axial rotor of the turbine, a leading edge located between the stator-side end and the rotor-side end, a trailing edge located between the stator-side end and the rotor-side end and located down-stream of the leading edge with respect to a fluid flow direction, wherein the rotor-side and stator-side ends have a negative sweep angle as measured between the instantaneous tangent of the blade surface and the fluid flow direction. Also, a turbine blade is provided, comprising a stator-side end located toward a stationary stator cylinder of the turbine, a rotor-side end located toward an axial rotor of the turbine, a delivery side located between the stator-side end and the rotor-side end, a suction side located between the stator-side end and the rotor-side end and located down-stream of the leading edge with respect to a fluid flow direction, wherein the rotor-side end is inclined toward the delivery side and the stator-side end is inclined with respect to a fluid flow direction.

18 Claims, 6 Drawing Sheets

U.S. PATENT DOCUMENTS

| | | | |
|---|---|---|---|
| 4,504,189 A * | 3/1985 | Lings | 415/192 |
| 4,714,407 A | 12/1987 | Cox et al. | |
| 5,249,922 A * | 10/1993 | Sato et al. | 415/191 |
| 5,474,419 A * | 12/1995 | Reluzco et al. | 415/209.4 |
| 6,071,077 A * | 6/2000 | Rowlands | 416/223 A |
| 6,099,248 A | 8/2000 | Mumm et al. | |
| 6,312,219 B1 * | 11/2001 | Wood et al. | 415/191 |
| 6,341,942 B1 | 1/2002 | Chou et al. | |
| 2002/0098082 A1 * | 7/2002 | Ito et al. | 415/191 |
| 2002/0141863 A1 * | 10/2002 | Liu et al. | 415/192 |
| 2003/0031564 A1 | 2/2003 | Kawarada et al. | |
| 2004/0091353 A1 | 5/2004 | Shahpar et al. | |

FOREIGN PATENT DOCUMENTS

| | | |
|---|---|---|
| DE | 42 28 879 A1 | 3/1994 |
| FR | 2 784 421 A1 | 4/2000 |
| WO | WO 02/055845 A1 | 7/2002 |

* cited by examiner

TURBINE BLADE

CROSS REFERENCE TO RELATED APPLICATIONS

This application is the US National Stage of International Application No. PCT/EP2004/006624, filed Jun. 18, 2004 and claims the benefit thereof. The International Application claims the benefits of European Patent application No. 03015496.7 EP filed Jul. 9, 2003, all of the applications are incorporated by reference herein in their entirety.

FIELD OF THE INVENTION

The invention relates to a turbine blade which has a blade height, a rotor-side end and a stator-side end, a leading edge and trailing edge and a suction side and delivery side and which is designed for use in relation to a general direction of flow, and also to a turbomachine which is equipped with such a turbine blade.

BACKGROUND OF THE INVENTION

In steam turbine construction, for example, curved guide blades are used as an embodiment of turbine blades especially when high three-dimensional flows occur which exhibit pronounced radial differences in the static pressure profile between the rotor side and the stator side, these differences arising due to deflection in the guide blades. In steam turbines, especially in low-pressure turbines with a large outflow cross section, the blade length to hub ratio is relatively high. The flow of a flow medium in the last stage of a low-pressure turbine having a large inflow cross section leads, in the case of a high blade length to hub ratio, to a radial reaction distribution which has an adverse effect on the efficiency of the steam turbine. The reaction distribution is in this case different in the radial direction and is low at the hub and high at the casing, this being felt to be a disadvantage.

In a thermal turbomachine, the percentage fraction of the isentropic enthalpy gradient in moving blades in relation to the entire isentropic enthalpy gradient over a stage consisting of a guide blade ring and a moving blade ring is designated as the isentropic reaction degree r. Such a stage in which the reaction degree is r=0 and the highest enthalpy gradient occurs is designated as a straightforward constant-pressure stage.

In a conventional excess-pressure stage, the reaction degree is r=0.5, so that the enthalpy gradient in the guide blades is exactly the same as in the moving blades. A reaction degree of r=0.75 is designated as a strong reaction. In steam turbine construction practice, the conventional excess-pressure stage and the constant-pressure stage are predominantly employed. As a rule, however, the latter has a reaction degree somewhat different from zero.

A low or even negative reaction of the hub leads to severe impairments and to efficiency losses of the turbine during operation. A high reaction of the casing gives rise to a high attack velocity of the moving blades in the tip region. The high attack velocity has an adverse effect on efficiency, since the behavior of flow losses is squarely proportional to velocity. A reduction in the reaction would remedy this. Moreover, a lower reaction of the casing would lead to a reduction in the gap losses, and the efficiency would thereby be additionally improved.

A high reaction in the hub region reduces the gap losses in the guide blade ring and thus leads to improved efficiency.

Curved guide blades are in this case used, in particular, in order to optimize the radial reaction distribution.

Turbines with guide blades curved only in the circumferential direction are known, for example, from DE 37 43 738. This shows and describes blades, the curvature of which is directed over the blade height toward the delivery side of the guide blade in each case adjacent to the circumferential direction. This publication also discloses blades, the curvature of which is directed over the blade height toward the suction side of the guide blade in each case adjacent to the circumferential direction.

Consequently, both radial and circumferentially running boundary layer pressure gradients are to be effectively reduced, and consequently the aerodynamic blade losses are to decrease in size.

Turbines with guide blades curved in the direction of flow and in the circumferential direction are known, for example, from DE 42 28 879.

Curved guide blades are also known from U.S. Pat. No. 6,099,248.

SUMMARY OF THE INVENTION

The object of the present invention is to specify a turbine blade and turbomachine in which the efficiency is improved.

In the turbine blade initially described, this is achieved, according to the invention, by means of the characterizing features as described in the claims.

The advantage of the invention is to be seen, inter alia, in that the radial reaction distribution is improved as a result of the improved inflow.

Further advantageous refinements are described in the subclaims.

BRIEF DESCRIPTION OF THE DRAWINGS

Exemplary embodiments of the invention are illustrated by means of the figures. In the figures, functionally similar components are designated by the same reference symbols.

In the figures.

DETAILED DESCRIPTION OF THE INVENTION

Figure 1:
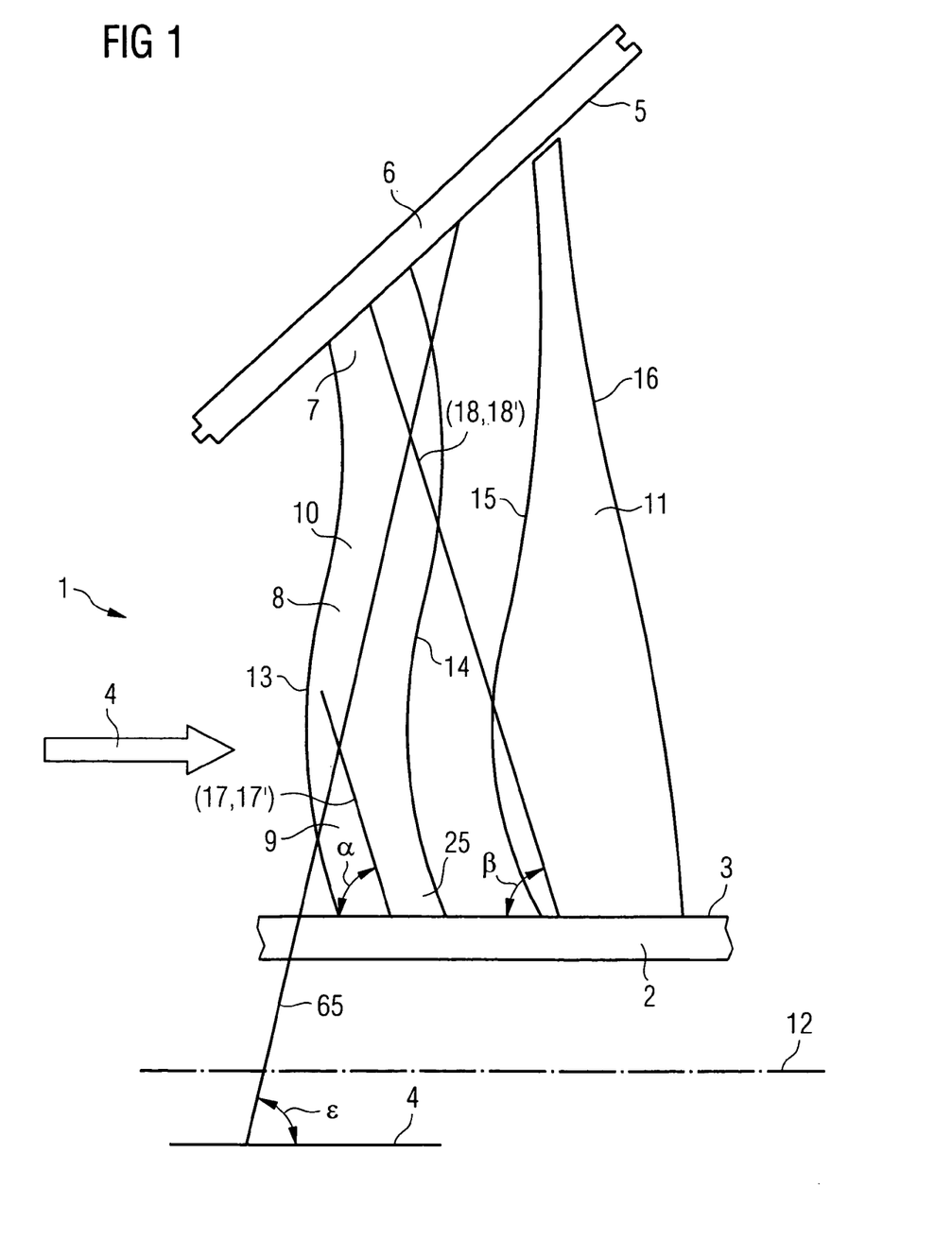
FIG. 1 shows a side view of a final stage, equipped with a turbine blade, of a turbomachine.

In the steam turbine final stage shown diagrammatically in a side view in FIG. 1, the walls delimiting a throughflow duct 1 are, on the one hand, a rotor-side duct wall 3 and, on the other hand, a stator-side duct wall 5. The stator-side duct wall 5 belongs to an inner casing 6. A final stage consists of a row of guide blades and a row of moving blades, of which in each case only one guide blade 10 and one moving blade 11 is shown in FIG. 1 for the sake of clarity. The guide blades are fastened to the inner casing 6 in a way not illustrated.

The moving blades are fastened in the rotor 2 in a way not illustrated.

The guide blade 10 has a stator-side end 7, a middle region 8 and a rotor-side end 9. A flow medium can flow through the duct 1 in the direction of flow 4. The direction of flow 4 is essentially parallel to an axis of rotation 12 of the rotor 2. The guide blade 10 has a leading edge 13 and a trailing edge 14 which are formed over the entire blade height.

The moving blade 11 likewise has a leading edge 15 and a trailing edge 16.

Figure 6:
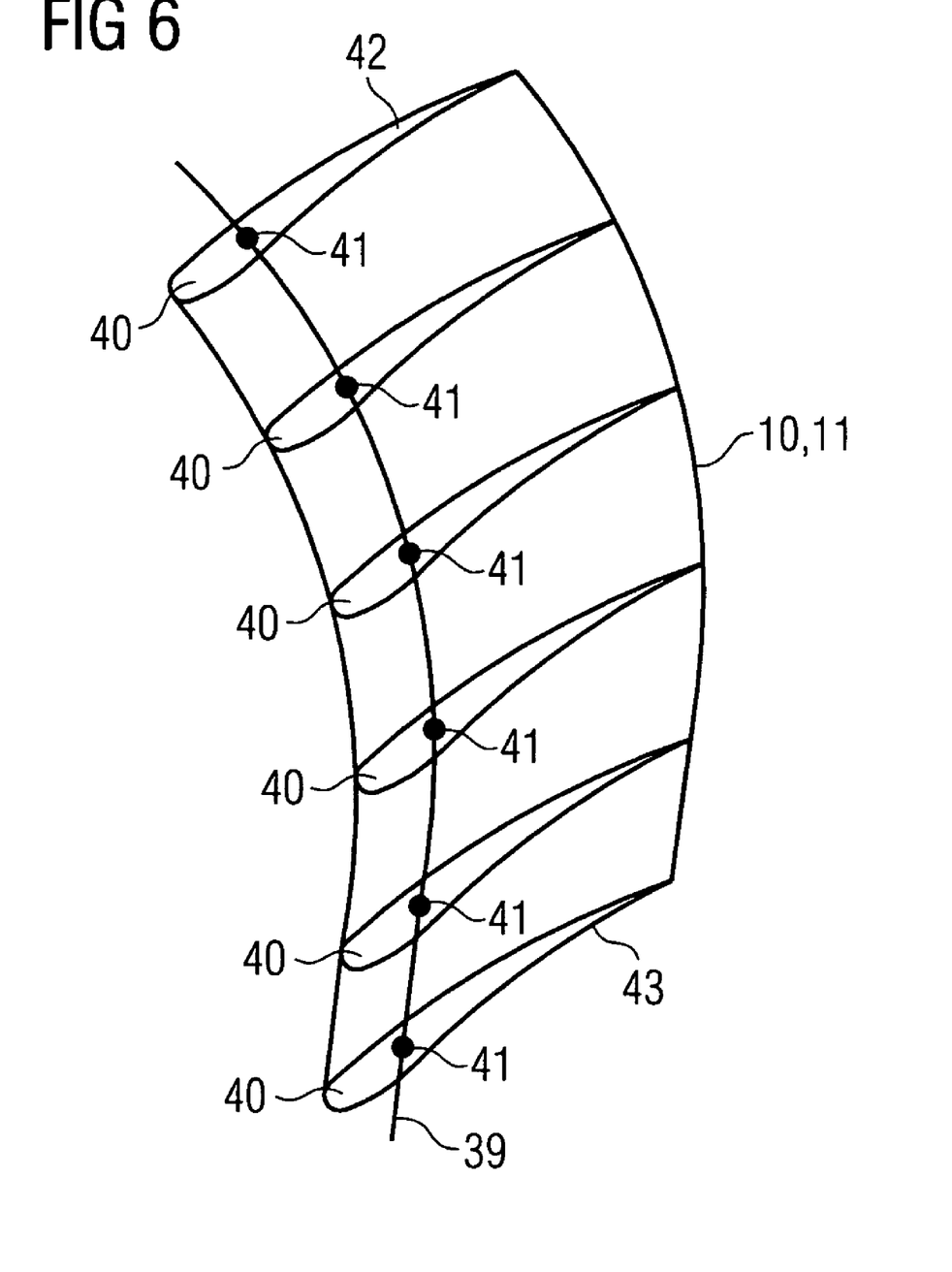
FIG. 6 shows a perspective view of a turbine blade.

As illustrated in FIG. 6, the disposition of the turbine blade 10 is described by means of a turbine blade form curve 39. The turbine blade 10 is divided into cylinder surfaces 40. For the sake of clarity, only six cylinder surfaces 40 are illustrated in FIG. 6. The turbine blade form curve 39 describes the disposition more accurately, the more cylinder surfaces 40 are formed. For each cylinder surface 40, its mass center of gravity 41 is determined. The turbine blade form curve 39 is formed by connecting the mass centers of gravity 41 from a turbine blade root 42 to the turbine blade tip 43.

As is evident from FIG. 1, the turbine blade form curve 39 terminates in each case at the rotor-side end 9 and at the stator-side end 7 of the turbine blade 10. The statements refer below to a turbine blade designed as a guide blade 10.

The turbine blade form curve 39 is considered at its rotor-side end 9, and the three-dimensional form of the turbine blade form curve 39 is depicted by a tangent which is to be understood as the mathematical derivation of the turbine blade form curve 39 in a curve direction. The tangent or mathematical derivation is designated at the rotor-side end 9 of the turbine blade form curve 39 as an auxiliary tangent 17. In other words: the three-dimensional form or the disposition of the turbine blade 10 at the rotor-side end 9 is illustrated by the auxiliary tangent 17.

The guide blade 10 is shaped at its rotor-side end 9 in such a way that it has a negative sweep in the direction of flow 4. Of course, the auxiliary tangent 17 likewise has a negative sweep with respect to the direction of flow 4.

The disposition of the stator-side end 7 of the guide blade 10 is illustrated by a second auxiliary tangent 18. In this case, the turbine blade form curve 39 is considered at its stator-side end 7, and the three-dimensional form of the turbine blade form curve 39 is depicted by a tangent which is to be understood as a mathematical derivation of the turbine blade form curve 39 in a curve direction.

The guide blade 10 is shaped at its stator-side end 7 in such a way that it has a negative sweep in the direction of flow 4. Of course, the auxiliary tangent 18 likewise has a negative sweep with respect to the direction of flow 4.

The disposition of the guide blade 10 is described in the center, in the middle region 8, essentially by an auxiliary tangent 65. In this case, the turbine blade form curve 39 is considered in its middle region 8, and the three-dimensional form of the turbine blade form curve 39 is depicted by the auxiliary tangent 65 which is to be understood as a mathematical derivation of the turbine blade form curve 39 in a curve direction. This starts from a point of the guide blade form curve 39 which lies in the middle region 8 and at this point forms a tangent or derivation produced as an auxiliary tangent 65.

The guide blade 10 is shaped in its middle region 8 in such a way that it has a positive sweep in the direction of flow 4. Of course, the auxiliary tangent 65 likewise has a positive sweep with respect to the direction of flow 4.

In an alternative embodiment, the middle region 8 may also have a negative sweep or even be perpendicular to the direction of flow 4.

Negative and positive sweeps are defined here as follows:

negative sweep: the direction of flow 4 must be rotated through an acute angle in a mathematically negative direction (clockwise) with respect to the auxiliary tangent 17 or to the auxiliary tangent 18, in order to achieve a coincidence of the direction of flow 4 with the auxiliary tangent 17 or 18.

Positive sweep: the direction of flow 4 must be rotated through an acute angle in a mathematically positive direction (counterclockwise) with respect to the auxiliary tangent 65, in order to achieve a coincidence of the direction of flow 4 with the auxiliary tangent 65.

The distance between the trailing edge 14 of the guide blade 10 and the leading edge 15 of the adjacent moving blade 11 is constant at the rotor-side end 9 and in the middle region 8.

In an alternative embodiment, the distance between the trailing edge 14 of the guide blade 10 and the trailing edge 15 of the adjacent moving blade 11 may be different.

The rotor-side end 9 and the stator-side end 7 lie essentially one above the other in the direction of flow 4.

Figure 2:
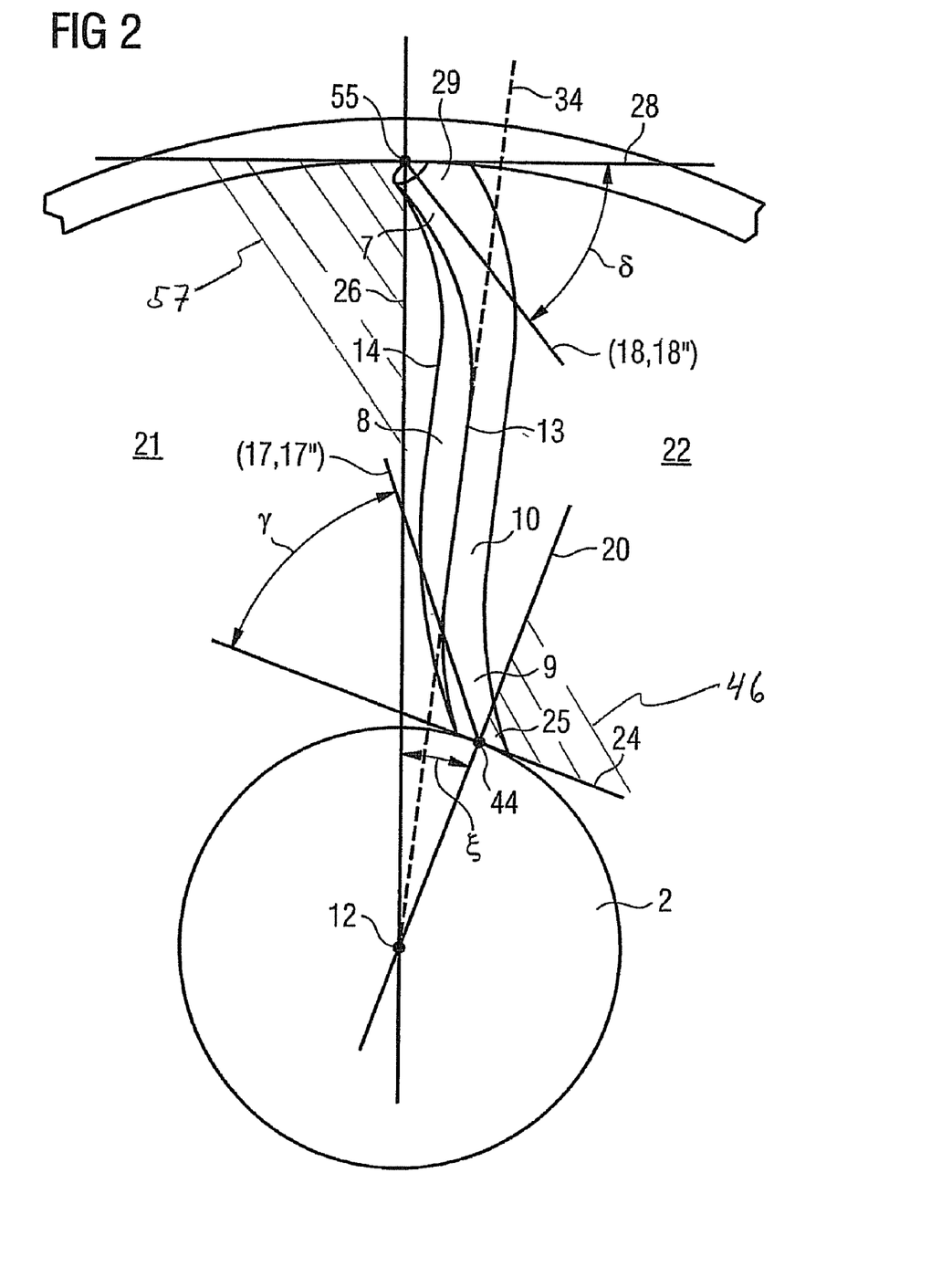
FIG. 2 shows a view of a guide blade in the direction of flow of a flow medium.

A view in the direction of flow 4 is illustrated in FIG. 2. The guide blade 10 lies between a delivery side 21 and a suction side 22. The middle line, shown in FIG. 2, between the delivery side 21 and the suction side 22 constitutes the leading edge 13. The direction of flow 4 runs essentially perpendicularly with respect to the drawing plane. The flow medium in this case flows along the direction of flow 4 and impinges first onto the leading edge 13 of the guide blade 10.

The rotor-side end 9 of the guide blade 10 is inclined in the direction of the delivery side 21. The stator-side end 7 is likewise inclined toward the delivery side 21.

In the middle region 8 of the guide blade 10, the guide blade 10 is inclined toward the suction side 22.

In an alternative embodiment, the middle region 8 may also be inclined toward the delivery side 21. In a further alternative embodiment, the middle region may be inclined neither toward the delivery side 21 nor toward the suction side 22.

However, in an alternative exemplary embodiment of the turbine blade, the middle region may also be oriented in a radial direction 34.

The leading edge 13 is positioned essentially upstream of the trailing edge 14 at the rotor-side end 9 of the guide blade 10.

The leading edge 13 is positioned essentially upstream of the trailing edge 14 in the direction of flow 4 at the stator-side end 7 of the guide blade 10.

In the middle region, the trailing edge 14 is displaced toward the delivery side 21 with respect to the leading edge 13.

The stator-side end 7 of the guide blade 10 is displaced in the radial direction 34 toward the delivery side 21 with respect to the rotor-side end 9.

Figure 4:
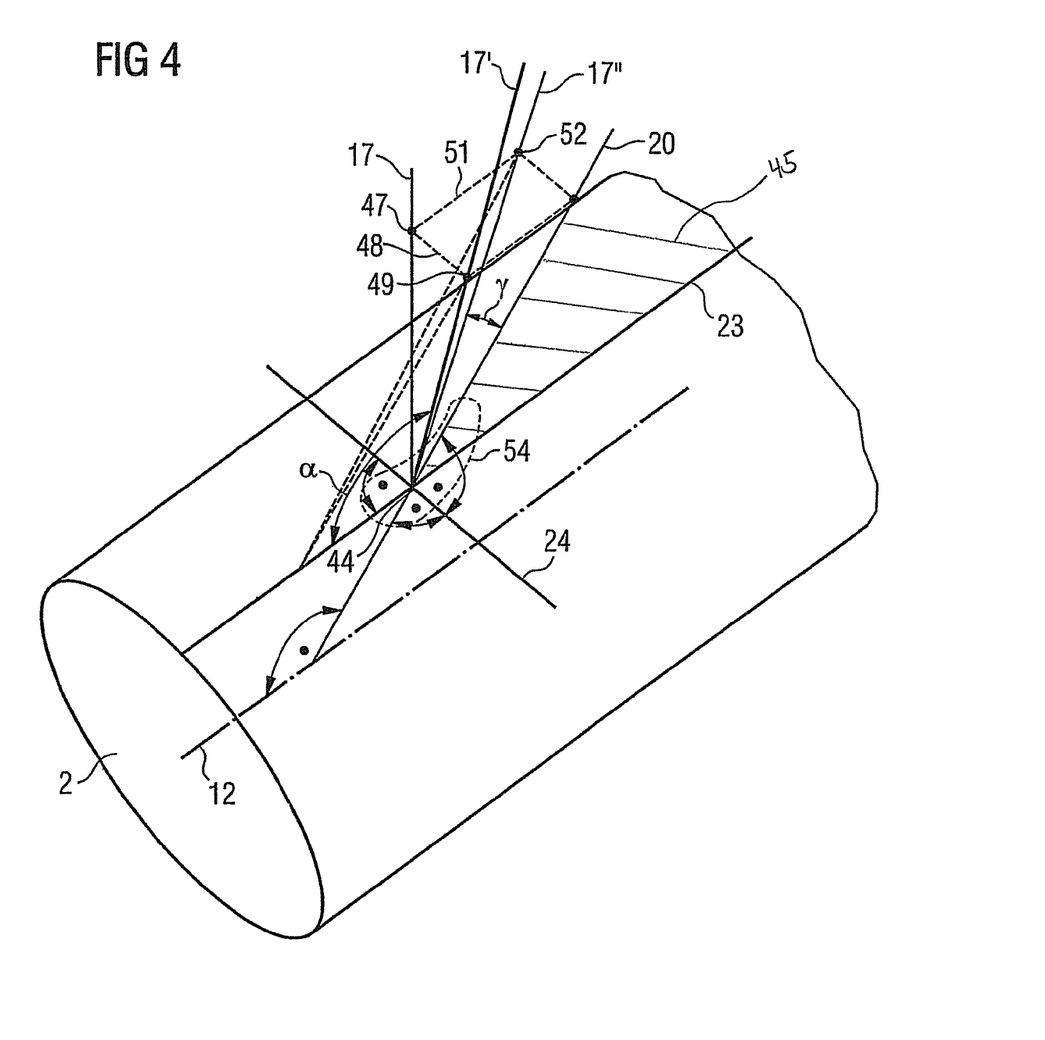
FIG. 4 shows a diagrammatic and perspective illustration of the turbine blade of FIG. 1 at a rotor-side end.

In FIG. 4, a diagrammatic and perspective illustration of the turbine blade 10, 11 at the rotor-side end 9 can be seen and serves for a more detailed explanation of the position of the auxiliary tangent 17 and of angles α and γ which are related to this.

The three-dimensional form of the turbine blade 10 has not been illustrated for the sake of clarity. The turbine blade 10 is illustrated at the rotor-side end 9 by the auxiliary tangent 17.

The auxiliary tangent 17 would, if prolonged in the direction of the rotor 2, touch the rotor 2 at a point 44. A first auxiliary axis 20 intersects the axis of rotation 12 perpendicularly and runs through the point 44.

A second auxiliary axis 23 intersects the first auxiliary axis 20 at the point 44 and runs essentially parallel to the direction of flow 4 which, in this exemplary embodiment, is parallel to the axis of rotation 12.

A third auxiliary axis 24 intersects the first auxiliary axis 20 at the point 44 and runs perpendicularly with respect to the first auxiliary axis 20 and perpendicularly with respect to the second auxiliary axis 23.

The first auxiliary axis 20 and the second auxiliary axis 23 form a first projection plane 45. The first auxiliary axis 20 and the third auxiliary axis 24 form a second projection plane 46.

The auxiliary tangent 17 is projected onto the first projection plane 45, in that each point of the auxiliary tangent 17 is projected onto the first projection plane 45 in the direction of the third auxiliary axis 24.

This is explained, by way of example, with reference to a point 47 of the auxiliary tangent 17. The point 47 is projected along a first projection straight line 48, in a direction running parallel to the third auxiliary axis 24, onto a first projection point 49 lying in the first projection plane 45. A first projection straight line 17' is thus projected onto the first projection plane 45.

The first projection straight line 17' is inclined at an angle $\alpha$ with respect to the second auxiliary axis 23.

The angle $\alpha$ may in this case assume values of between 0° and 90°, in particular the value of the angle $\alpha$ lies between 50° and 80°.

The auxiliary tangent 17 is also projected onto the second projection plane 46, in that each point of the auxiliary tangent 17 is moved in the direction of the second auxiliary axis 23 onto the second projection plane 46 until this is touched.

This is explained by way of example, with reference to the point 47 of the auxiliary tangent 17. The point 47 is projected along a second projection straight line 51, in a direction running parallel to the second auxiliary axis 23, onto a second projection point 52 lying in the second projection plane 46. A second projection straight line 17" is thus formed on the second projection plane 46.

The second projection straight line 17" is inclined at an angle $\gamma$ with respect to the first auxiliary axis 20.

The angle $\gamma$ may assume values which lie between 0° and 90°, in particular the angle $\gamma$ lies at 70°.

The rotor-side end face of the turbine blade 10 is indicated by a dashed line run 54.

Figure 5:
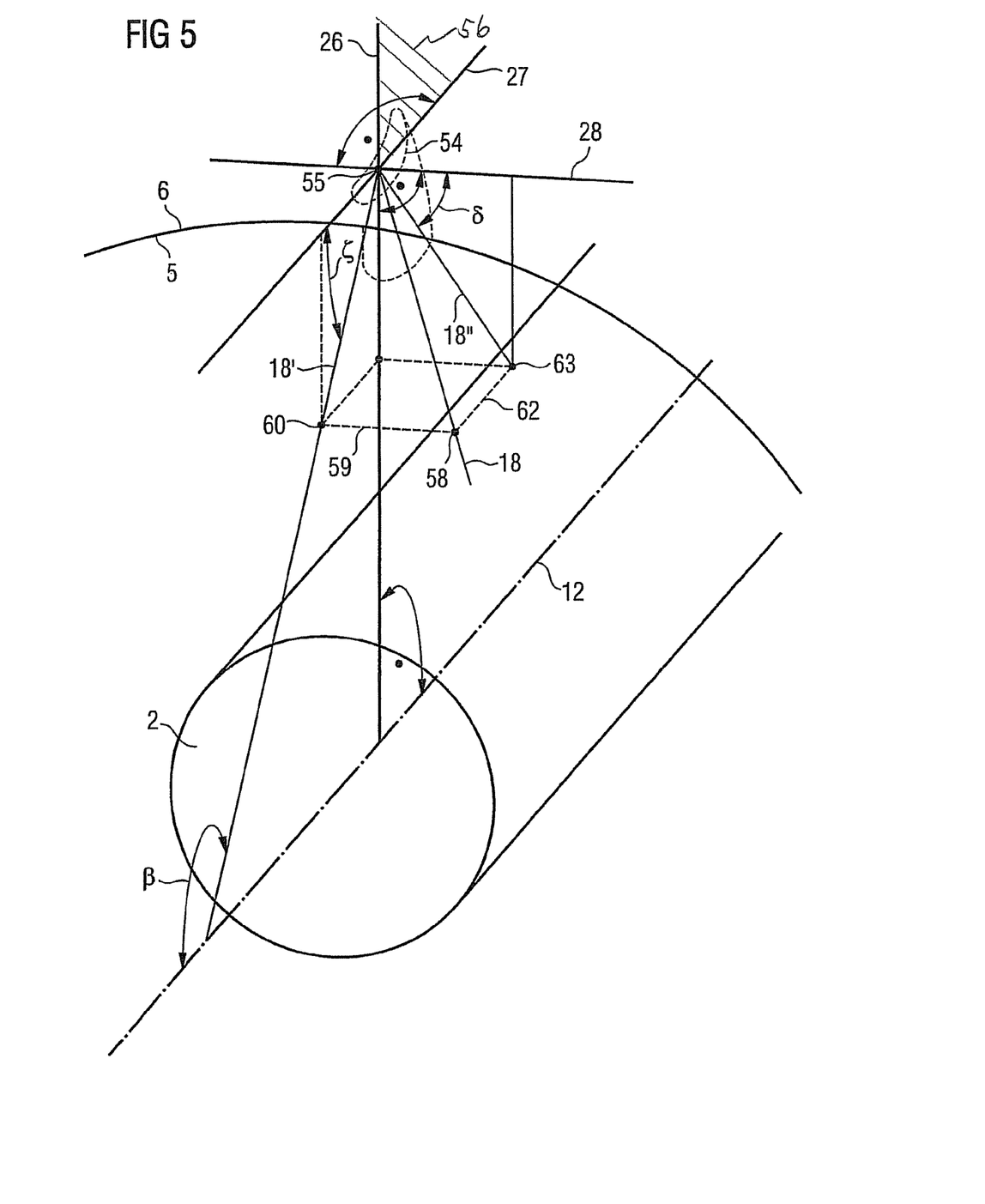
FIG. 5 shows a diagrammatic and perspective illustration of the turbine blade of FIG. 1 at a stator-side end.

In FIG. 5, a diagrammatic and perspective illustration of the turbine blade 10 of the stator-side end 7 can be seen and serves for a more detailed explanation of the positions of the auxiliary tangent 18 and of angles $\beta$, $\delta$ and $\xi$ which are related to this.

The three-dimensional form of the turbine blade 10 has not been illustrated for the sake of clarity. The turbine blade 10 is illustrated at the stator-side end 7 by the auxiliary tangent 18.

The auxiliary tangent 18 would, in its prolongation in the direction of the inner casing 6, touch the inner casing 6 at a point 55.

A fourth auxiliary axis 26 intersects the axis of rotation 12 perpendicularly and runs through the point 55. A fifth auxiliary axis 27 intersects the fourth auxiliary axis 26 at the point 55 and runs parallel to a surface of the inner casing at the point 55. A sixth auxiliary axis 28 intersects the fourth auxiliary axis 26 perpendicularly at the point 55 and runs perpendicularly with respect to the fifth auxiliary axis 27.

The fourth auxiliary axis 26 and the fifth auxiliary axis 27 form a third projection plane 56. The fourth auxiliary axis 26 and the sixth auxiliary axis 28 form a fourth projection plane 57.

The auxiliary tangent 18 is projected onto the third projection plane 56, in that each point of the auxiliary tangent 18 is moved in the direction of the sixth auxiliary axis 28 onto the third projection plane 56 until it touches the latter.

This is explained, by way of example, by means of a point 58 of the auxiliary tangent 18. The point 58 is projected along a third projection straight line 59, in a direction running parallel to the sixth auxiliary axis 28, onto a third projection point 60 lying in the third projection plane 56. A third projection tangent 18' is thus projected onto the third projection plane 56.

The projection tangent 18' is inclined at an angle $\xi$ with respect to the fifth auxiliary axis 27. The angle $\xi$ lies between 0° and 180°.

The projection tangent 18' is also inclined at an angle $\beta$ with respect to the axis of rotation 12. The angle $\beta$ may assume essentially values of between 0° and 90°.

The auxiliary tangent 18 is also projected onto the fourth projection plane 57, in that each point of the auxiliary tangent 18 is moved in the direction of the fifth auxiliary axis 27 onto the fourth projection plane 57 until it touches the latter.

This is explained, by way of example, by means of the point 58 of the auxiliary tangent 18. The point 58 is projected along a fourth projection straight line 62, in a direction running parallel to the fifth auxiliary axis 27, onto a fourth projection point 63 lying in the fourth projection plane 57. A fourth projection tangent 18" is thus projected onto the fourth projection plane 57.

The projection tangent 18" is inclined at an angle $\delta$ with respect to the sixth auxiliary axis 28. The angle $\delta$ lies between 0° and 90°, preferably the angle $\delta$ is 75°.

Figure 3:
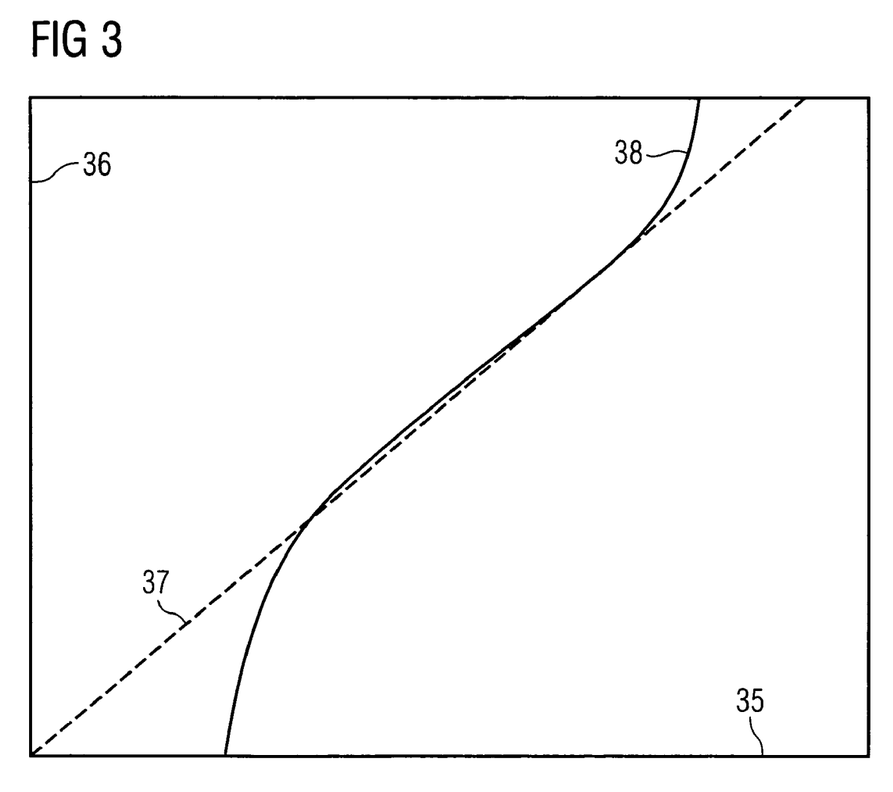
FIG. 3 shows a blade with an illustration of a reaction distribution according to the prior art and of a turbine blade according to the invention, shown in FIG. 1.

FIG. 3 illustrates, as a graph, a reaction distribution as a function of a blade height. The X-axis 35 in this case represents the reaction distribution in arbitrary units. The Y-axis 36 in this case represents the distance from a hub. The dashed line 37 shows the profile of the reaction distribution according to the previous prior art. The unbroken line 38 shows the profile of the reaction distribution when the guide blades are designed according to the invention illustrated here.

As mentioned initially, it is a disadvantage if the reaction distribution in the radial direction 34 is different. The dashed line 37, which illustrates the reaction distribution according to the previous prior art, shows the abovementioned behavior which is felt to be a disadvantage. According to this, the reaction distribution from the hub to the casing is different. The unbroken line 38 shows an improved reaction distribution, as compared with the dashed line 37.

The invention claimed is:

1. A turbine blade adapted for installation in a turbine engine having a stationary stator cylinder and a rotatably supported rotor, comprising:
    a stator-side end located toward the stationary stator cylinder of the turbine engine;
    a rotor-side end located toward the rotatably supported rotor of the turbine engine;
    a leading edge located between the stator-side end and the rotor-side end; and
    a trailing edge located between the stator-side end and the rotor-side end and located down-stream of the leading edge with respect to a fluid flow direction,
    wherein both the rotor-side and the stator-side ends each respectively have a negative sweep angle as measured between the instantaneous tangent of a blade form curve and the fluid flow direction; and
    wherein rotor-side instantaneous tangents and stator-side instantaneous tangents intersect a longitudinal plane, the plane extending from an axis of rotation of the rotatably supported rotor and passing through a point disposed in a middle region of the leading edge, and wherein portions of rotor-side instantaneous tangents and stator-side instantaneous tangents radially outward from the points of intersection are on a same side of the longitudinal plane.

2. The turbine blade of claim 1, wherein negative sweep results in the direction of flow being rotated in a mathematically negative direction in order to achieve a coincidence of the direction of flow with respect to the instantaneous tangent of the blade surface.

3. The turbine blade of claim 1, wherein the negative sweep angle of the rotor-side and stator-side ends transitions into a positive sweep in a region between the leading edge and trailing edge.

4. The turbine blade as claimed in claim 1, wherein the rotor-side end negative sweep has a range between 0° and 90°.

5. The turbine blade as claimed in claim 4, wherein the rotor-side end negative sweep has a range between 50° and 80°.

6. The turbine blade as claimed in claim 1, wherein the stator-side end negative sweep has a range between 0° and 90°.

7. The turbine blade as claimed in claim 1, wherein the turbine blade is a stationary guide blade or a rotating blade.

8. The turbine blade as claimed in claim 1, wherein the leading edge is arranged in front of the trailing edge in the axial direction of flow at the stator-side end or the rotor-side end.

9. The turbine blade as claimed in claim 1, wherein the turbine blade is arranged in a turbomachine.

10. The turbine blade as claimed in claim 1, wherein a second up-stream turbine guide blade is located at a constant axial distance from the turbine blade.

11. The turbine blade as claimed in claim 10, wherein a trailing edge of the second up-stream guide blade is located at a constant axial distance from the leading edge of the blade at the rotor-side end.

12. A turbine blade, comprising:
a stator-side end located toward a stationary stator cylinder of a turbine;
a rotor-side end located toward an axial rotor of the turbine;
a delivery side located between the stator-side end and the rotor-side end; and
a suction side located between the stator-side end and the rotor-side end and located down-stream of a leading edge of the blade with respect to a fluid flow direction,
wherein a rotor-side end blade form curve is inclined toward the delivery side, and a stator-side end blade form curve is inclined with respect to the fluid flow direction and inclined toward the delivery side,
wherein the stator-side end blade form curve incline angle is 70° with respect to the fluid flow direction.

13. A turbine blade, comprising:
a stator-side end located toward a stationary stator cylinder of a turbine;
a rotor-side end located toward an axial rotor of the turbine;
a delivery side located between the stator-side end and the rotor-side end; and
a suction side located between the stator-side end and the rotor-side end and located down-stream of a leading edge of the blade with respect to a fluid flow direction.,
wherein a rotor-side end blade form curve is inclined toward the delivery side, and a stator-side end blade form curve is inclined with respect to the fluid flow direction and inclined toward the delivery side,
wherein the rotor-side end blade form curve is inclined at an angle between 0° and 90° viewed in the direction of flow, where the rotor-side end blade faun curve incline angle is defined as the acute angle between the instantaneous blade form curve tangent of the rotor and a radial axis emanating from a rotor longitudinal axis of rotation and intersecting the auxiliary tangent at an inner casing.

14. The turbine blade as claimed in claim 13, wherein the rotor-side end blade form curve incline angle is 75°.

15. The turbine blade as claimed in claim 12, is a stationary guide blade or a rotating blade.

16. The turbine blade as claimed in claim 12, wherein the turbine blade is arranged in a turbomachine.

17. The turbine blade as claimed in claim 12, wherein a second up-stream turbine guide blade is located at a constant axial distance from the turbine blade.

18. The turbine blade as claimed in claim 17, wherein a trailing edge of the second up-stream guide blade is located at a constant axial distance from the leading edge of the turbine blade at the rotor-side end.

* * * * *